(12) United States Patent
Rossetto et al.

(10) Patent No.: US 10,836,473 B2
(45) Date of Patent: Nov. 17, 2020

(54) MECHANISMS, SYSTEMS AND METHODS TO ALLOW STEP-AJDUSTMENT OF AERODYNAMIC SURFACES

(71) Applicant: EMBRAER S.A., São José dos Campos—SP (BR)

(72) Inventors: Andre Luiz Rossetto, São José dos Campos—SP (BR); Arilton Nunes de Mattos, São José dos Campos—SP (BR)

(73) Assignee: EMBRAER S.A., São José dos Campos—SP (BR)

( * ) Notice: Subject to any disclaimer, the term of this patent is extended or adjusted under 35 U.S.C. 154(b) by 285 days.

(21) Appl. No.: 15/791,757

(22) Filed: Oct. 24, 2017

(65) Prior Publication Data

US 2019/0118938 A1 Apr. 25, 2019

(51) Int. Cl.
| | |
|---|---|
| *B64C 25/16* | (2006.01) |
| *F16B 5/02* | (2006.01) |
| *B64C 1/12* | (2006.01) |
| *B64C 25/34* | (2006.01) |
| *B64C 7/02* | (2006.01) |

(52) U.S. Cl.
CPC ............. *B64C 25/16* (2013.01); *B64C 1/12* (2013.01); *F16B 5/0225* (2013.01); *F16B 5/0233* (2013.01); *B64C 7/02* (2013.01); *B64C 25/34* (2013.01)

(58) Field of Classification Search
CPC .. B64C 1/12; B64C 1/26; B64C 25/16; B64C 25/08; B64C 2025/125; F16B 5/00225; F16B 5/0223; F16B 5/0216; F16B 5/02; F16B 5/0004; F16B 37/045
See application file for complete search history.

(56) References Cited

U.S. PATENT DOCUMENTS

| | | | | |
|---|---|---|---|---|
| 4,964,594 A | * | 10/1990 | Webb .................. | B64C 1/12 244/129.3 |
| 2002/0008178 A1 | * | 1/2002 | Roloff .................. | B64C 25/16 244/129.4 |

(Continued)

FOREIGN PATENT DOCUMENTS

| | | | | |
|---|---|---|---|---|
| AT | 515304 A4 | * | 8/2015 | ............ F16B 5/01 |
| CA | 2962547 A1 | * | 12/2017 | ............ B64C 1/068 |

(Continued)

*Primary Examiner* — Assres H Woldemaryam
(74) *Attorney, Agent, or Firm* — Nixon & Vanderhye P.C.

(57) ABSTRACT

Adjustment mechanisms, systems and methods allow for a moveable aerodynamic surface to be positionally adjusted relative to a stationary adjustment surface so as to ensure smooth aerodynamic transition between such surfaces. The adjustment mechanisms may include a base structure adapted for fixed connection to the moveable aerodynamic surface, a fixed-position receiver opposing the base structure and adapted for positionally fixed connection to the support structure of the moveable aerodynamic surface and an adjustment bolt having a head and a threaded shaft extending from the head through an elongate slot of the base structure, the slot defining an elongate axis which is aligned with an adjustment axis for the moveable aerodynamic surface, and being threadably coupled to the receiver to operably interconnect the base structure and the receiver.

6 Claims, 3 Drawing Sheets

(56) References Cited

U.S. PATENT DOCUMENTS

| | | | | |
|---|---|---|---|---|
| 2005/0140098 A1* | 6/2005 | Etling | ................ | B64C 1/12 |
| | | | | 277/630 |
| 2006/0157621 A1* | 7/2006 | Santos Rubio | ......... | B64C 25/16 |
| | | | | 244/129.4 |
| 2012/0192495 A1* | 8/2012 | Coughenour, Jr. | ... | F16B 37/044 |
| | | | | 49/464 |
| 2016/0068262 A1* | 3/2016 | Casse | ................ | B64C 25/16 |
| | | | | 244/129.5 |
| 2018/0362135 A1* | 12/2018 | Storozuk | ............ | B64C 1/12 |
| 2019/0003500 A1* | 1/2019 | Oetlinger | ............ | F16B 5/02 |

FOREIGN PATENT DOCUMENTS

| | | | | |
|---|---|---|---|---|
| DE | 3304569 C1 | * | 7/1984 | |
| DE | 102004023143 A1 | * | 11/2005 | ............... A47K 3/30 |
| EP | 1217136 A2 | * | 6/2002 | ............ F16B 37/045 |
| EP | 3225555 A1 | * | 10/2017 | ............. F16B 35/04 |
| EP | 3335980 A1 | * | 6/2018 | ............... B64C 1/12 |
| FR | 2814428 A1 | * | 3/2002 | ........... F16B 5/0241 |
| GB | 2299391 A | * | 10/1996 | ........... F16B 33/002 |

\* cited by examiner

MECHANISMS, SYSTEMS AND METHODS TO ALLOW STEP-AJDUSTMENT OF AERODYNAMIC SURFACES

FIELD

The embodiments disclosed herein relate generally to mechanisms, systems and methods which allow for the adjustment of aerodynamic surfaces, such as moveable aerodynamic access doors associated with stationary aircraft structures, to thereby ensure a proper aerodynamic fit exists therebetween.

BACKGROUND

Moveable aerodynamic surfaces, e.g., moveable doors that cover aircraft structures such as landing gear, must be accurately adjusted relative the adjacent stationary aircraft surfaces in order to minimize steps and/or misalignment therebetween that can cause aerodynamic drag which adversely affects aircraft performance. Larger and/or geometrically complex aerodynamic surfaces require substantially more resources during assembly and/or repair in order to ensure smooth aerodynamic transitions between the stationary aircraft surfaces and the moveable aerodynamic surfaces.

There are several conventional techniques that are currently employed in the aerospace industry to allow for relative positional adjustment of the moveable aerodynamic surface to ensure a proper aerodynamic fit with adjacent stationary aircraft surfaces (colloquially known as the "step" between surfaces). By way of example, eccentric mechanisms have been positioned in decentralized locations relative to the axis in which the mechanism is located so as vary the positional relationship of the surfaces relative to one another. Access doors may also be positioned on the aerodynamic surface to allow access to internally accessed adjustment mechanisms. Stationary shims may optionally or additionally be installed in certain aerodynamic surfaces to allow relative surface variation of position to be achieved in dependent upon the position of the shim. Some prior proposals for surface step adjustments involves the use of adjustable rods installed on certain aerodynamic surfaces which allow step adjustment between the moveable surface and an adjacent stationary surface.

While such prior proposals allow for step adjustment to be achieved between aerodynamic surfaces, their use typically involves extensive labor requirements that increase the time (and hence cost) of aircraft manufacture and/or repair. It would therefore be highly desirable if step adjustment between adjacent aerodynamic surfaces could be more readily achieved in a less labor intensive manner. It is towards providing such improvements to aerodynamic surface step adjustments that the embodiments disclosed herein are directed.

SUMMARY

The embodiments disclosed herein are directed toward adjustment mechanisms, systems and methods whereby a moveable aerodynamic surface may be positionally adjusted relative to a stationary adjustment surface so as to ensure smooth aerodynamic transition between such surfaces. The adjustment mechanisms may include a base structure adapted for fixed connection to the moveable aerodynamic surface, a fixed-position receiver opposing the base structure and adapted for positionally fixed connection to the support structure of the moveable aerodynamic surface and an adjustment bolt having a head and a threaded shaft extending from the head through an elongate slot of the base structure, the slot defining an elongate axis which is aligned with an adjustment axis for the moveable aerodynamic surface, and being threadably coupled to the receiver to operably interconnect the base structure and the receiver.

The base structure may comprise a recessed cup defining a space for receiving the head of the adjustment bolt and having a wall which defines the elongate slot. A removable cover plate may be provided so as to cover the space defined by the recessed cup.

At least one and preferably an opposing pair of base flanges are provided so as to positionally fix the base structure to the moveable aerodynamic surface. The receiver may comprise a mounting flange and a receiver boss which extends outwardly from the mounting flange and is threadably coupled to the threaded shaft of the adjustment bolt.

Systems which allow positional adjustment of the movable aerodynamic surface relative to an adjacent stationary aerodynamic surface along mutually perpendicular Y- and Z-axes of adjustment are also provided whereby the system comprises at least one Y-axis adjustment mechanism and at least one Z-axis adjustment mechanism. The Y-axis adjustment mechanism will have the elongate axis of the elongate slot thereof oriented parallel to the Y-axis of adjustment while the Z-axis adjustment mechanism will have the elongate axis of the elongate slot thereof oriented parallel to the Z-axis of adjustment. The base structure of the Y-axis adjustment mechanism is moveable relative to the opposing receiver within the elongate slot in a direction of the Y-axis of adjustment in response to turning movement applied to the adjustment bolt of the Z-axis adjustment mechanism. In a similar manner, the base structure of the Z-axis adjustment mechanism is moveable relative to the opposing receiver within the elongate slot in a direction of the Z-axis of adjustment in response to turning movement applied to the adjustment bolt of the Y-axis adjustment mechanism.

Aircraft may be provided with a system comprised of the Y-axis and Z-axis adjustment mechanisms. As one non-limiting example, an L-shaped landing gear door may have forward and aft sets of such Y-axis and Z-axis adjustment mechanisms wherein each such set provides for X- and Z-axes of adjustment within a respective forward and aft adjustment planes defined thereby.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

Figure 1:
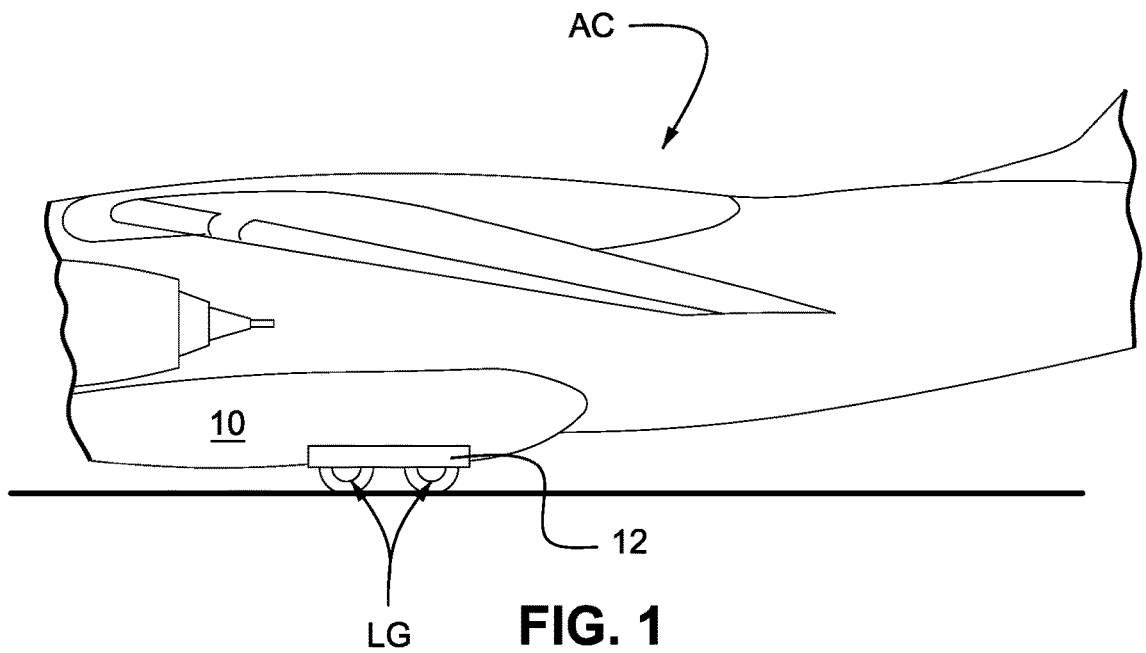
FIG. 1 is a partial side elevational view of an aircraft which includes generally L-shaped main landing gear doors associated with fixed position landing gear door bay.
Figure 2:
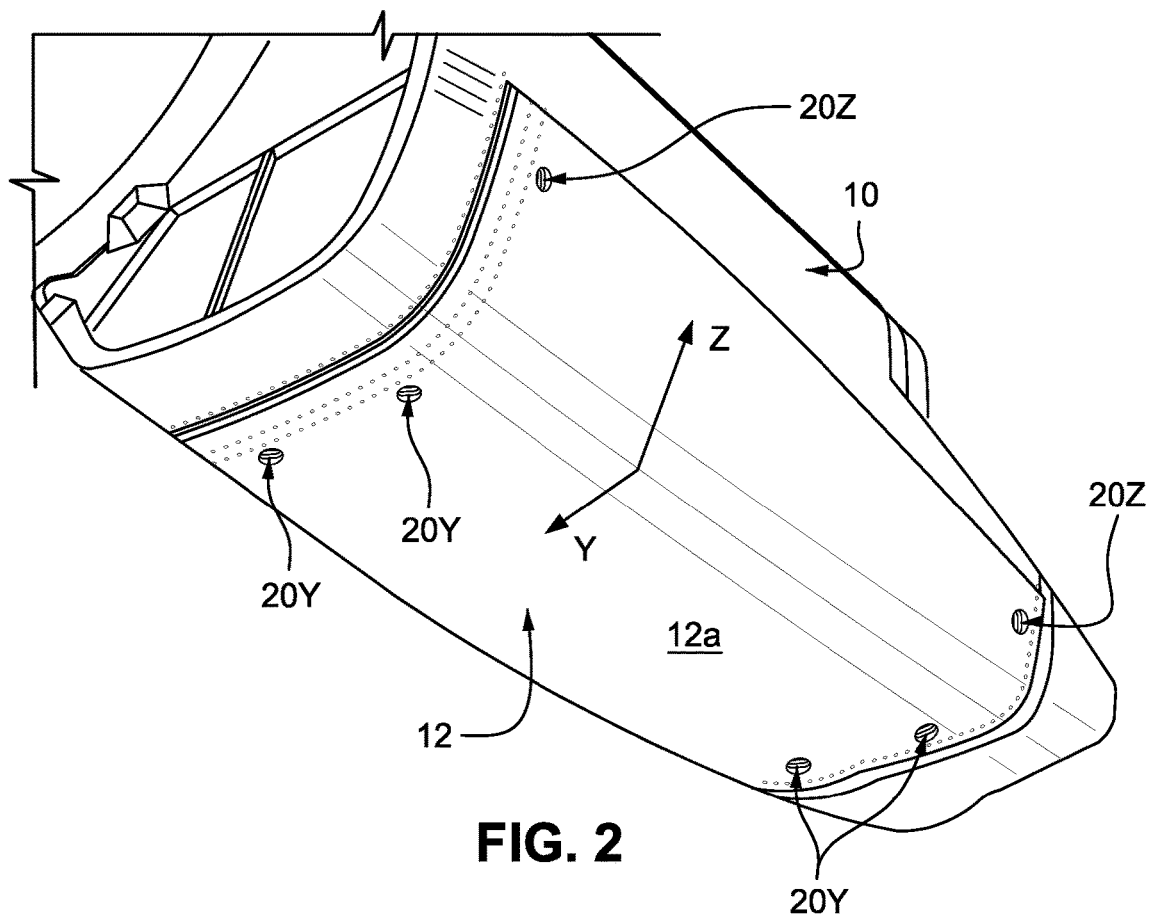
FIG. 2 is a partial perspective view of the landing gear door bay with the landing gear door in a closed position and depicting the layout arrangement of mechanisms to allow aerodynamic adjustment of the landing gear door relative to the stationary fixed-position bay.

FIG. 1 is a partial side elevational view of an aircraft AC which includes retractable landing gear LG depicted in an extended positions for ground operations. The landing gear LG will be housed within a landing gear bay 10a having exterior aerodynamic surfaces when retracted for flight operations and covered by generally L-shaped main landing gear doors 10b as shown in FIG. 2. It will of course be understood that only the port-side landing gear LG is shown in the Figure but the aircraft AC will include an opposite starboard side landing gear LG and associated landing gear bay 10 and gear door 12. In addition, a nose landing gear with associate gear door(s) not shown will typically be provided as part of the landing gear system for the aircraft AC. Each of such landing gear doors may thus embody the adjustment mechanisms as disclosed herein.

The landing gear door 12 in the embodiment depicted in FIGS. 1 and 2 is provided with multiple distributed adjustment mechanisms 20Y and 20Z to allow adjustments of the L-shaped landing gear door 12 relative to mutually perpendicular Y- and Z-axes. In the embodiment depicted, a forward Z-axis adjustment mechanism 20Z and a pair of forward Y-axis mechanisms 20Y are oriented in a forward plane defined by respective mutually perpendicular Y- and Z-axes. Similarly, an aft Z-axis adjustment mechanism 20Z and a pair of aft Y-axis adjustment mechanisms 20Y are oriented in an aft plane defined by respective mutually perpendicular Y- and Z-axes.

Figure 3:
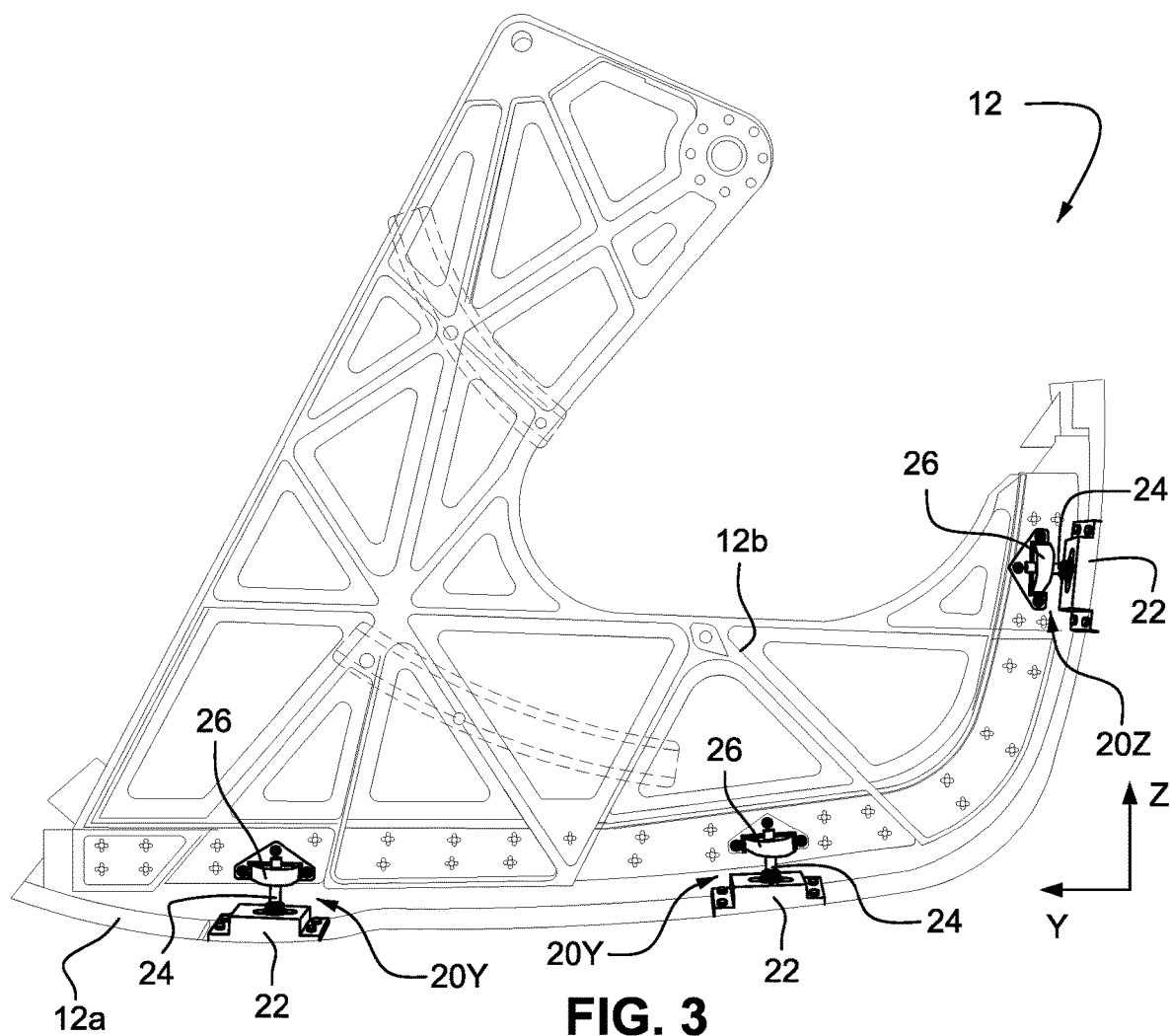
FIG. 3 is a front end sectional view looking aft of the landing gear door as shown in FIG. 2 with its associated structural support arms.

Accompanying FIG. 3 shows an end elevational view of the L-shaped landing gear door 12 in which the forward set of Y-axis adjustment mechanisms 20Y and the forward Z-axis mechanism are depicted. The descriptions herein related to such forward adjustment mechanisms 20Y, 20Z are also applicable to the aft adjustment mechanisms 20Y, 20Z for the door 12. As can be seen, the gear door 12 includes an external door skin 12a (e.g., a sheet of lightweight material such as aluminum or similar metal alloys employed in the aerospace industry, fiber reinforced plastic (FRP) and the like which establish the external aerodynamic surface) which is connected to a conformably shaped door support bracket 12b by the adjustment mechanisms 20Y, 20Z.

Figure 4:
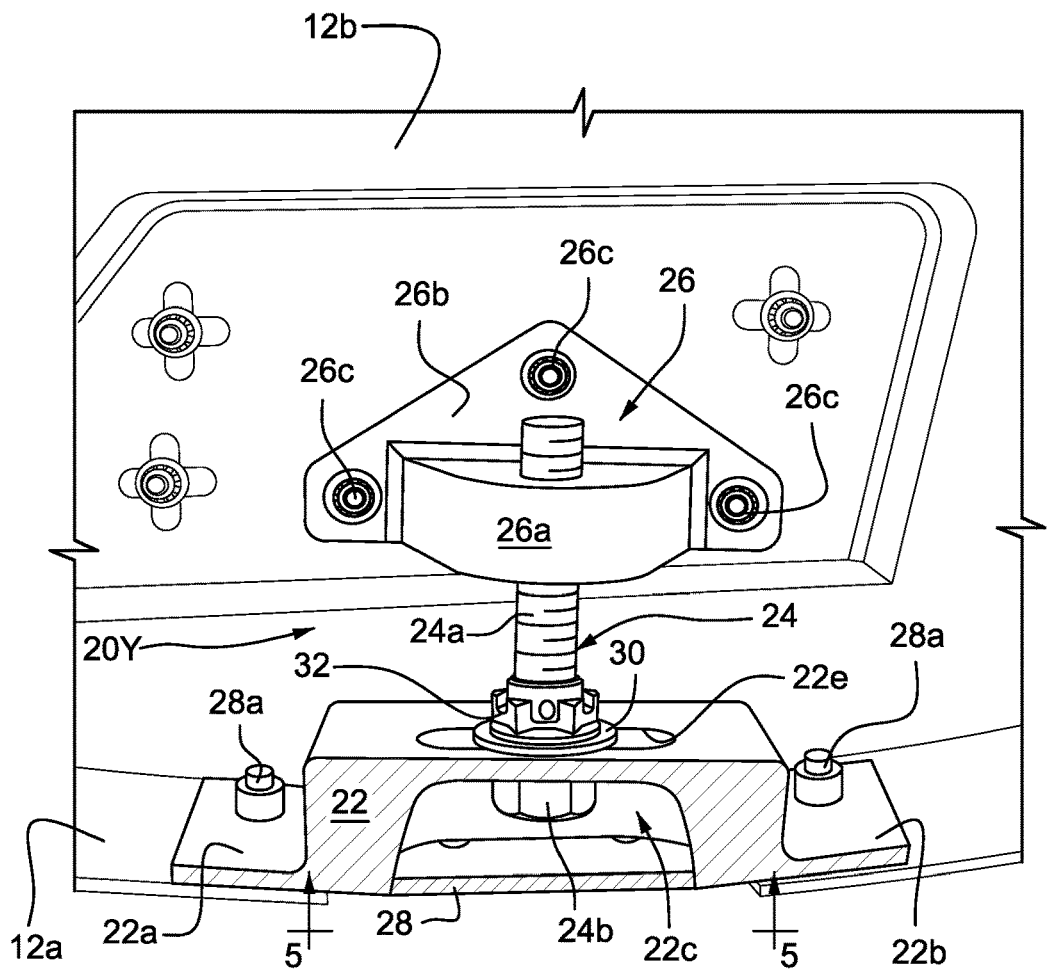
FIG. 4 is an enlarged detail perspective view of a representative adjustment mechanism employed in the embodiments described herein.
Figure 5:
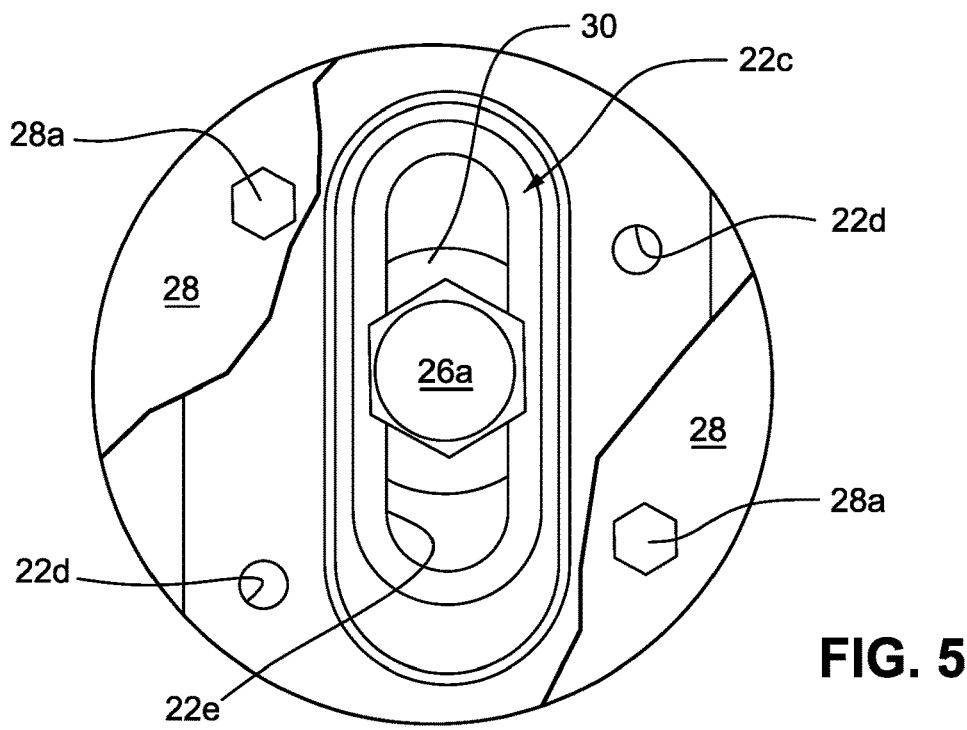
FIG. 5 is an enlarged exterior plan view of the adjustment mechanism depicted in FIG. 4 as shown by lines 5-5 therein.

FIGS. 4 and 5 show enlarged views of an exemplary one of the Y-axis adjustment mechanisms 20Y and are similarly exemplary of the Z-axis adjustment mechanism 20Z. Thus, the descriptions of the structures and functions associated with the adjustment mechanism 20Y are likewise similarly relevant to the Z-axis mechanism. As shown, the adjustment mechanism 20Y generally includes a base structure 22, an adjustment bolt 24 and a threaded receiver 26 which threadably receives the threaded shaft 24a of the bolt 24 and is opposingly spaced from the based structure 22.

The base structure 22 includes opposing base flanges 22a, 22b which are positionally fixed to the door skin 12a, e.g. by welding or the like. The base structure 22 also defines a recessed cup space 22c which is covered by a planar cover plate 28 that may be removably attached to the base structure 22 by suitable fasteners 28a, such as the screw/nut assembly as depicted, studs, rivets or the like, received within apertures 22d. The recessed cup space 22c receives the head 24b of the adjustment bolt 24 and includes a wall portion which defines an elongate slot 22e sized to receive therethrough the threaded shaft 24a of the adjustment bolt 24.

The back (interior) side of the base structure 22 may include a washer 30 positioned adjacent the base structure 22 and sufficiently large to span the dimension of the slot 22e. A castle nut 32 is preferably threaded onto the shaft 24a of the adjustment bolt 24 so as to positionally retain the dimensional separation between the base structure 22 and the receiver boss 26 following final adjustments of the door skin 12a relative to the support structure 12b. The shaft 24a of the adjustment bolt 24 may also include an aperture to allow it to be safety-wired or cotter-pinned to the castle nut 32 to prevent loosening during use.

The receiver 26 includes a receiver boss 26a which includes a threaded female socket to threadably receive therein a portion of the threaded shaft 26a of the adjustment bolt 24. The receiver boss 26a extends outwardly from a mounting flange 26b fixed to the support structure 12b of the gear door 12, e.g., by welding or by threaded fastener assemblies 26c as shown and/or studs or rivets as may be required.

The Y-axis adjustment mechanisms are positioned so that the elongate axes of the respective slot 22e thereof are oriented parallel to the Y-axis of adjustment which the Z-axis adjustment mechanism is positioned so that the respective slot 22e thereof is oriented parallel to the Z-axis of adjustment. In use, therefore, incremental adjustments of the door skin 12a relative to the external aerodynamic surface of the landing gear bay 10 is achieved by applying turning movements to the respective adjustment bolts 24 (e.g., by applying torque using a turning tool connected to the head 24b thereof) so as to adjust the separation distances between the respective base structures 22 and their opposed receivers 26. Thus, for standard right-hand threads associated with the shaft 24a and receiver boss 26a, clockwise turning movement of the adjustment bolts 24 will decrease the separation distance between the opposed base structures 22 and receivers 26 thereby moving the skin 12a closer to the adjacent supporting bracket 12b. Conversely, counter-clockwise turning movement of the adjustment bolts 24 will increase the separation distance between the opposed base structures 22 and receivers 26 thereby moving the skin 12a away from the adjacent supporting bracket 12b.

Such relative displacement of the skin 12a relative to the adjacent supporting bracket 12b is permitted along the Y- and Z-axes by virtue of the aligned elongate slots 22e associated with the Y-axis adjustment mechanisms 20Y and the Z-axis adjustment mechanisms 20Z, respectively. It will thus be appreciated that since the Z-axis adjustment mechanisms have the axes of the elongate slots 22e oriented to be parallel to the Z-axis, adjustable movement of the adjustment bolts 24 associated with the Y-axis adjustment mechanisms 20Y will responsively cause the skin 12a to move along (parallel to) the Z-axis. Similarly, since the Y-axis adjustment mechanisms have the axes of the elongate slots 22e oriented to be parallel to the Y-axis, adjustable movement of the adjustment bolts 24 associated with the Z-axis adjustment mechanisms 20Z will responsively cause the skin 12a to move along (parallel to) the Y-axis. As such, selected turning movements of the adjustment bolts 24 associated with the Y-axis adjustment mechanisms 20Y and/or the Z-axis adjustment mechanisms 20Z will allow step adjustments to be achieved between the door skin 12*a* and the adjacent aerodynamic surface of the wheel bay 10.

Various modifications within the skill of those in the art may be envisioned. Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. An aircraft comprising:
    retractable landing gear,
    a landing gear door assembly associated with the retractable landing gear, the landing gear door assembly comprising a supporting bracket and an external door skin which is moveable with the landing gear, the landing gear door assembly being L-shaped and having a horizontally and vertically oriented portions extending generally along the Y- and Z-axes, respectively,
    a stationary aerodynamic surface of the aircraft adjacent to the moveable external door skin, and
    a system to allow positional adjustment of the movable external door skin relative to the adjacent stationary aerodynamic surface along mutually perpendicular Y- and Z-axes of adjustment, the system comprising at least one Y-axis adjustment mechanism and at least one Z-axis adjustment mechanism each of the Y-axis and Z-axis mechanisms being positioned within a plane defined by the mutually perpendicular Y-axis and Z-axis, respectively, wherein each of the Y-axis and Z-axis mechanisms comprises:
        a base structure positionally fixed to the moveable aerodynamic surface, the base structure including a wall having an elongate slot defining an elongate axis and a recessed cup, wherein the Y-axis adjustment mechanism has the elongate axis of the elongate slot thereof oriented parallel to the Y-axis of adjustment and the Z-axis adjustment mechanism has the elongate axis of the elongate slot thereof oriented parallel to the Z-axis of adjustment;
        a receiver immovably fixed to the supporting bracket for the moveable external door skin in opposing relationship to the base structure; and
        an adjustment bolt having a head and a threaded shaft extending from the head through the elongate slot of the base structure and being threadably coupled to the receiver to operably interconnect the base structure and the receiver, wherein the head of the adjustment bolt is received within a defined space of the recessed cup of the base structure and is accessible from an exterior side of the moveable external door skin, and wherein the base structure of the Y-axis adjustment mechanism is moveable relative to the opposing receiver within the elongate slot in a direction of the Y-axis of adjustment in response to turning movement applied to the adjustment bolt of the Z-axis adjustment mechanism, and wherein the base structure of the Z-axis adjustment mechanism is moveable relative to the opposing receiver within the elongate slot in a direction of the Z-axis of adjustment in response to turning movement applied to the adjustment bolt of the Y-axis adjustment mechanism, and wherein.

2. The aircraft according to claim 1, wherein the system comprises forward and aft sets of the Y-axis and Z-axis adjustment mechanisms.

3. The aircraft according to claim 1, further comprising a removable cover plate which covers the defined space of the recessed cup.

4. The aircraft according to claim 1, wherein the base structure comprises at least one base flange which is adapted to being positionally fixed to the moveable external door skin.

5. The aircraft according to claim 1, wherein the receiver comprises a mounting flange and a receiver boss extending outwardly from the mounting flange and being threadably coupled to the threaded shaft of the adjustment bolt.

6. A method of adjusting the immovable external door skin associated with the landing gear assembly of the aircraft according to claim 1, wherein the method comprises the steps of:
    positioning the retractable landing gear assembly in a retracted state with the moveable landing gear door closed; and
    manipulating the adjustment screw of at least one of the Y-axis and Z-axis adjustment mechanisms so as to adjustably move the moveable landing gear door when closed along at least one of the Z- and Y-axes, respectively, so as to positionally adjust the moveable landing gear door relative to the stationary aerodynamic surface.

* * * * *